United States Patent Office 2,778,865
Patented Jan. 22, 1957

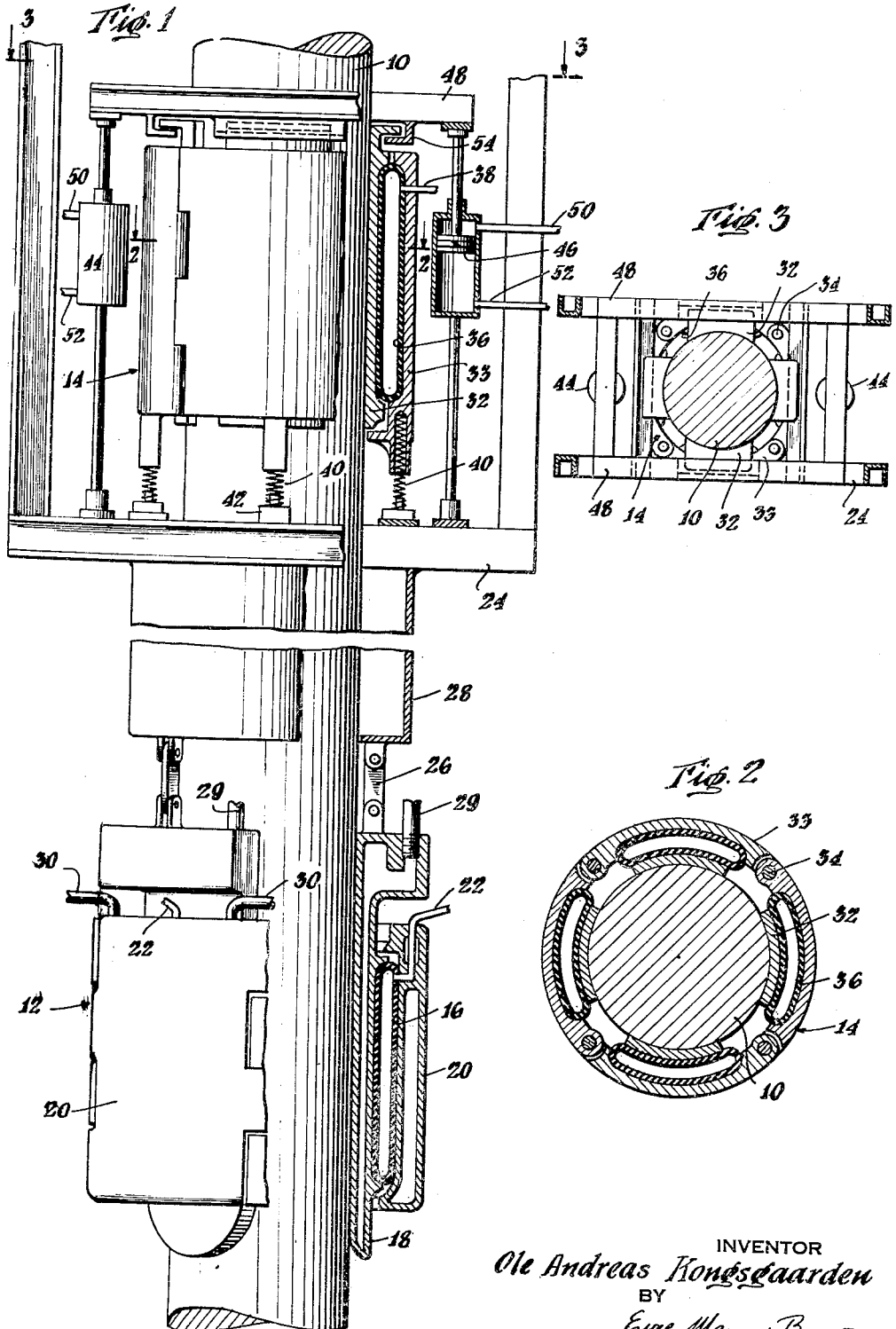

2,778,865

SUSPENSION MECHANISM FOR CONTINUOUS TYPE ELECTRODES AND METHOD OF OPERATION

Ole Andreas Kongsgaarden, Vagsbygd, pr. Kristiansand S, Norway, assignor to Elektrokemisk A/S, Oslo, Norway, a corporation of Norway Application January 9, 1956, Serial No. 558,166

7 Claims. (Cl. 13—16)

The present invention is directed to a suspension mechanism for electrodes of the type described in United States Patent No. 2,668,183. As there described, the electrode in an electric smelting furnace is suspended and controlled by means of a holder comprising a main clamp and an auxiliary clamp. During operation of the furnace the electrode is periodically lowered through the holder by means of the clamps. This is done by releasing the grip of the main clamp so that the electrode is free to slide down through this clamp until the auxiliary clamp which continues to grip the electrode moves down against a stop. The main clamp is then closed and the auxiliary clamp opened and returned to its starting position above the stop. With this construction, displacement of the electrode through the holder is extremely uniform and the holder has been used with great advantage particularly in connection with self-baking or Söderberg type of electrodes which require uniform conditions in the furnace.

There is however a great deal of insulating dust ordinarily generated in electric smelting furnaces particularly in the open type furnaces such as those employed for smelting high grade ferro-silicon ores, and experience has shown that when the grip of the main clamp is released insulating dust gets inside the clamp where it tends to bake and stick. A coating is soon built up which interferes with the flow of electricity and the coating also tends to promote arcing which may so damage the clamp that it has to be replaced.

Highly effective means have now been devised for lowering the electrode through the holder without releasing the grip of the main clamp. Since the main clamp is kept closed it is difficult for dust to get inside the clamp, and since the main clamp is under positive clamping pressure at all times the contact surfaces of the clamp and electrode are wiped clean of insulating dust each time the electrode is moved through its holder. As a result, the tendency for an insulating coating to form inside the clamp is eliminated.

In accordance with the present invention the electrode is held by a main clamp which exerts a yielding pressure on the exterior of the electrode sufficient to hold the electrode against the force of gravity. When it is desired to move the electrode further down into the furnace, a positive external force is applied to the electrode which acts in addition to the weight of the electrode to exert sufficient pressure to move the electrode through the main clamp so that the electrode is forced to slide slowly down through the clamp, which continues to grip the electrode with full clamping pressure. The external or supplemental force that acts in addition to the weight of the electrode is applied by means of an auxiliary clamp or gripping means which preferably but not necessarily grips the electrode above the main clamp. One of the most convenient ways of applying the external force is to arrange several pulling devices around the electrode in such a way that they act in parallel to pull down on the auxiliary clamp which in turn transmits the force of the pull to the electrode causing it to move down through the main clamp of the holder. The pulling device may, for example, be a cylinder with a piston therein adapted to pull down on the auxiliary clamp.

After the electrode has reached the desired level the pull of the pistons is stopped and the grip of the auxiliary clamp is released and the clamp is then returned to its starting position. This may be done by means of springs as described in United States Patent No. 2,668,183, or, if desired, the action of the piston may be reversed to push the auxiliary clamp back into starting position.

As to construction of the clamps, the area of each clamp should be great enough so that it can hold the weight of the electrode against the force of gravity without substantial distortion of the surface of the electrode and the auxiliary clamp must be capable of gripping the electrode tight enough so that it will transmit the supplemental external force to the electrode without slipping. The clamps described in United States Patent No. 2,668,183 are suitable for this purpose provided the spring in the auxiliary clamp is made strong enough so that the clamp will transmit the external force to the electrode without slipping. Other types of clamps may also be used such as the ones described in United States Patent No. 2,673,227 granted March 23, 1954 and in United States Patent application Serial No. 472,972, filed December 3, 1954, now Patent No. 2,758,145, granted Aug. 7, 1956, wherein a rubber bag and a flexible membrane, respectively, are employed for locking the clamps in place on the electrode. All of these clamps may be tightened and loosened by remote control means and they are of particular advantage for my purpose because clamping pressure is supplied by fluid or spring means which give yielding pressure in the sense that the clamp can yield and adjust itself to irregularities in the circumference of the electrode without loss of clamping pressure.

This invention may be readily understood by reference to the accompanying drawings in which:

Fig. 1 is a front elevational view of the suspension mechanism cut away in part to illustrate its construction;

Fig. 2 is a sectional view taken on line 2—2 of Fig. 1; and

Fig. 3 is a top view taken on line 3—3 of Fig. 1.

In the drawings, electrode 10 is supported by means of an electrode holder comprising a main friction clamp 12 and an auxiliary clamp 14. For the purpose of illustration, the clamp of United States Patent No. 2,673,227 is shown as main friction clamp 12. Construction of clamp 12 is identical to that of the clamp of the patent and the details of its construction will not be repeated herein. It is to be noted, however, that flexible bags 16 are positioned between the electrode contact clamp members 18 and ring member 20 and that clamping pressure against member 18 is controlled by means of fluid supplied to the flexible bags by means of pipes 22. Clamp 12 is suspended from a suspension frame 24 by means of rods 26 and by means of the usual cylindrical casing or skirt 28 which protects the electrode against dust and excessive heat. The clamp members 18 and ring member 20 are hollow for circulating the cooling water supplied by pipes 29 and 30, respectively. Pipe 29 may be made of copper so that it can also be used for transmitting electric current to the clamp.

The construction of auxiliary clamp 14 is substantially the same as main clamp 12 with the exception that clamp 14 need not be water cooled since it is outside the intense heating zone of the furnace. Auxiliary clamp 14 includes the usual contact clamp members 32 which are surrounded by an outside ring 33 here shown with four sections hinged together as at 34. Each clamp member is operated by a flexible bag 36 positioned between the outside ring and clamp member. Fluid pressure is supplied to the bags by means of pipes 38, and as clearly shown in the drawings, clamping pressure of the auxiliary clamp is controlled by the pressure in bags 36. Auxiliary clamp 14 is positioned above suspension frame 24 on a plurality of vertical springs 40 which in turn bear against movable pedestals 42 on top of the frame. Springs 40 are strong enough to support the weight of auxiliary clamp 14 but they are not strong enough to support the weight of electrode 10. Fluid is supplied to pipes 22 and 38 under pressure great enough so that the holder will support the full weight of the electrode without slipping.

The supplemental external force for displacing electrode 10 down through the holder is here shown as being supplied by means of two or more cylinders 44 which are rigidly mounted on top of suspension frame 24. Each cylinder has a piston 46 and the rods of the pistons are connected to a frame 48 which rests on top of auxiliary clamp 14. The piston rods are arranged in parallel relationship so that the force of the pistons will be uniformly transmitted to the electrode by frame 48 and auxiliary clamp 14. Fluid pressure for operating the pistons is supplied to cylinders 44 by means of pipes 50 and 52.

In operation electrode 10 is ordinarily supported by the main friction clamp 12 and when it becomes necessary to lower the electrode through the holder fluid pressure is supplied to auxiliary clamp 14 and at the same time fluid pressure is supplied to cylinders 44 by means of pipes 50. The force of the pressure in the cylinder tends to drive pistons 46 downwardly and this force is transmitted to auxiliary clamp 14 which in turn transmits the force to the electrode. At this time clamping pressure of auxiliary clamp 14 must of course be great enough so that the clamp will transmit the force of the pull of the pistons without slipping on the electrode.

When this external force on the electrode becomes great enough to overcome the frictional grip of main clamp 12, electrode 10 will slowly and evenly slide down through the clamp to wipe off any insulating dust that may have accumulated on the contact surfaces of the electrode and clamp. As stated above, the clamping pressure against member 18 is controlled by means of fluid supplied to the flexible bags by means of pipes 22. In this way, if desired, clamping pressure on the main clamp may be slightly reduced to expedite moving the electrode through the clamp but clamping pressure must be positive and sufficient to maintain contact between the clamp and electrode at all times. Electrode slippage is stopped by releasing the pressure on cylinder 44. Thereupon main clamp 12 will again support the electrode without slipping and pressure on the auxiliary clamp 14 is released and the clamp returned to its starting position above frame 24. This may be done by means of the tension in springs 40 or if cylinders 44 are double acting as shown, auxiliary clamp 12 may be returned to its starting position by reversing the action of pistons 46 with fluid pressure supplied to cylinders 44 by means of pipes 52. If pistons 46 are to be used for returning auxiliary clamp 12 to its starting position, then frame 48 must be connected to the auxiliary clamp as at 54. It will also be noted that pistons 46 may be used as brakes for controlling movement of the electrode. This may be done by supplying positive pressure to the cylinders by means of pipes 52 and this pressure may be gradually reduced to give the desired movement of the electrode under the influence of the supplemental external force.

The electrode suspension mechanism of this invention has been found to be particularly useful in connection with electrodes employed in furnaces for calcium carbide, ferro-alloys and the like. Electrodes in such furnaces are ordinarily large, ranging up to 40 to 60 inches in diameter.

It will be understood that this invention is not to be limited to the specific construction of the clamps and pulling devices described herein. Any suitable clamps tightened by means of yielding pressure and any suitable means for applying an external supplemental force to the gripping means for overcoming the frictional grip of the main clamp on the electrode may be used without departing from the spirit and scope of the invention. Although the invention has been illustrated in connection with round electrodes, it is obvious that different shapes and types of electrodes may be used—for example, square, oblong, or oval electrodes, both prebaked or continuous, may be used.

It will further be understood that it is intended to cover all changes and modifications of the preferred embodiment of the invention herein chosen for the purpose of illustration which do not constitute departures from the spirit and scope of the invention.

What I claim is:

1. A suspension mechanism for the electrode of an electric furnace which includes a main clamp, means for supplying yielding pressure to the clamp to tighten it so that it will support the weight of the electrode, means for supplying electric current to the clamp for transmission to the electrode and means for applying an external force to the electrode that acts in addition to the weight of the electrode to overcome the frictional grip of the main clamp and force the electrode to slide slowly down through the main clamp of the suspension mechanism whereby the electrode may be lowered through the clamp and the contact surfaces between the clamp and electrode wiped clean of insulating dust generated in the furnace.

2. An electrode suspension mechanism for an electric furnace which includes a main clamp and an auxiliary clamp, remote control means for supplying yielding pressure for tightening the clamps, means for applying an external force to the auxiliary clamp that acts in addition to the weight of the electrode to overcome the grip of the main clamp on the electrode and force the electrode to slide down through the main clamp while maintaining positive pressure on the same sufficient to maintain contact between the clamp and electrode at all times and said pressure means for tightening the clamps being adapted to supply enough clamping pressure to the auxiliary clamp so that it will transmit the external force to the electrode without slipping, whereby the contact surfaces of the main clamp and electrode are wiped clean of insulating dust each time the electrode is lowered down through the main clamp of the suspension mechanism.

3. A structure as specified in claim 2 which includes spring means positioned below the auxiliary clamp adapted to return this clamp to its starting position when the grip of the clamp on the electrode is released.

4. A structure as specified in claim 2 in which the means for applying external force to the electrode includes a plurality of cylinders each of which has a piston therein adapted to pull downwardly on the auxiliary clamp, means for connecting the pistons to the auxiliary clamp and means for supplying fluid pressure to the top of the cylinders to force the pistons down in the cylinders.

5. A structure as specified in claim 2 in which the pressure supplied for operating the clamps is fluid pressure.

6. The method of operating an electrode suspension mechanism for an electric furnace, which mechanism is of the type comprising a main clamp which grips the electrode tight enough to support the entire weight of the electrode alone, and yielding pressure means for controlling the grip of the clamp which comprises the steps of applying an external force to the electrode that acts in addition to the weight of the electrode to overcome the frictional grip of the main clamp and force the electrode to slide down through such clamp and then stopping the external force when the electrode has reached the desired level below such clamp whereby the contact surfaces between the main clamp and the electrode may be wiped clean of insulating dust each time the electrode is displaced down through the suspension mechanism.

7. The method of operating an electrode suspension mechanism for an electric furnace, which mechanism is of the type comprising a main clamp and an auxiliary clamp, each of which grips the electrode tight enough to support the entire weight of the electrode alone, and yielding pressure means for controlling the grip of the clamps which comprises the steps of applying an external force to the auxiliary clamp that acts in addition to the weight of the electrode to overcome the frictional grip of the main clamp and force the electrode to slide slowly down through such clamp, increasing the pressure on the auxiliary clamp to tighten it so that it will transmit the external force to the electrode without slipping, stopping the external force when the electrode has reached the desired level below the main clamp, releasing the pressure on the auxiliary clamp and then moving the auxiliary clamp back to its starting position above the main clamp.

References Cited in the file of this patent

UNITED STATES PATENTS

| | | |
|---|---|---|
| 2,668,183 | Foyn | Feb. 2, 1954 |
| 2,673,227 | Hubert | Mar. 23, 1954 |
| 2,698,871 | Ritter et al. | Jan. 4, 1955 |
| 2,758,145 | Bjerkas | Aug. 7, 1956 |